United States Patent
Peitzer

(10) Patent No.: US 10,390,317 B2
(45) Date of Patent: Aug. 20, 2019

(54) FACILITATION OF LINK LOSS REDUCTION FOR RADIO ANTENNAS

(71) Applicant: AT&T Mobility II LLC, Atlanta, GA (US)

(72) Inventor: Haywood Peitzer, Randolph, NJ (US)

(73) Assignee: AT&T MOBILITY II LLC, Atlanta, GA (US)

(\*) Notice: Subject to any disclaimer, the term of this patent is extended or adjusted under 35 U.S.C. 154(b) by 0 days.

(21) Appl. No.: 15/908,233

(22) Filed: Feb. 28, 2018

(65) Prior Publication Data

US 2018/0192380 A1 Jul. 5, 2018

Related U.S. Application Data

(63) Continuation of application No. 15/075,443, filed on Mar. 21, 2016, now Pat. No. 9,942,861.

(51) Int. Cl.
| | |
|---|---|
| *H04W 52/52* | (2009.01) |
| *H04W 52/24* | (2009.01) |
| *H04B 17/12* | (2015.01) |
| *H04W 88/08* | (2009.01) |

(52) U.S. Cl.
CPC ............ *H04W 52/52* (2013.01); *H04B 17/12* (2015.01); *H04W 52/242* (2013.01); *H04W 88/08* (2013.01)

(58) Field of Classification Search
CPC ... H04W 52/52; H04W 52/242; H04W 88/08; H04B 17/12; H02J 17/00
USPC ........................................ 455/522, 418, 450
See application file for complete search history.

(56) References Cited

U.S. PATENT DOCUMENTS

| | | |
|---|---|---|
| 8,750,942 B1 | 6/2014 | Ng |
| 9,021,049 B2 | 4/2015 | Bai et al. |
| 9,124,703 B2 | 9/2015 | Tadayon et al. |
| 9,211,811 B2 | 12/2015 | Breed |
| 9,277,370 B2 | 3/2016 | Addepalli et al. |
| 9,277,451 B1 | 3/2016 | Rasool et al. |
| 2012/0149341 A1* | 6/2012 | Tadayon .............. H04B 5/0062 455/412.1 |
| 2014/0163870 A1 | 6/2014 | Riley |
| 2015/0003318 A1 | 1/2015 | Meyer et al. |
| 2015/0061945 A1 | 3/2015 | Chakam et al. |

(Continued)

FOREIGN PATENT DOCUMENTS

| | | |
|---|---|---|
| DE | 102007029952 A1 | 1/2009 |
| WO | 2013000752 A1 | 1/2013 |

OTHER PUBLICATIONS

Mastrosimone, et al., "A Comparative Analysis of mmWave vs LTE Technology for 5G Moving Networks", Networking and Communications (WiMob), IEEE 11th International Conference on Wireless and Mobile Computing, 2015, pp. 422-429, IEEE, 8 pages.

(Continued)

*Primary Examiner* — Shaima Q Aminzay
(74) *Attorney, Agent, or Firm* — Amin, Turocy & Watson, LLP

(57) ABSTRACT

A more efficient antenna can be facilitated by accounting for the cable link loss associated with the distance from antenna base equipment to the antenna. As an antenna transitions between various link layers of a telecommunications network, the cable link loss can be accounted for to determine a compensation value. The compensation value can then be used to account for the cable link loss to allow for a more efficient antenna.

20 Claims, 11 Drawing Sheets

(56) References Cited

U.S. PATENT DOCUMENTS

2015/0214607 A1 7/2015 Lee et al.
2015/0358471 A1 12/2015 Roth et al.

OTHER PUBLICATIONS

Lu, et al., "Connected Vehicles: Solutions and Challenges", IEEE Internet of Things Journal, Aug. 2014, pp. 289-299, vol. 1, No. 4, IEEE, 11 pages.
Office Action dated Jul. 26, 2017 for U.S. Appl. No. 15/075,443, 25 pages.

* cited by examiner

FACILITATION OF LINK LOSS REDUCTION FOR RADIO ANTENNAS

RELATED APPLICATION

The subject patent application is a continuation of, and claims priority to, U.S. patent application Ser. No. 15/075,443 (now U.S. Pat. No. 9,942,861), filed Mar. 21, 2016, and entitled "FACILITATION OF LINK LOSS REDUCTION FOR RADIO ANTENNAS," the entirety of which application is hereby incorporated by reference herein.

TECHNICAL FIELD

This disclosure relates generally to facilitating antenna gains. More specifically, this disclosure relates to facilitating an antenna gain based on a compensation factor initiated in response to layer selection.

BACKGROUND

A link budget is an accounting of all of the gains and losses from a transmitter, through a medium (free space, cable, waveguide, fiber, etc.) to a receiver in a telecommunication system. It accounts for the attenuation of the transmitted signal due to propagation, as well as the antenna gains, feedline, and miscellaneous losses. Randomly varying channel gains such as fading are taken into account by adding some margin depending on the anticipated severity of its effects. The amount of margin required can be reduced by the use of mitigating techniques such as antenna diversity or frequency hopping.

An antenna's power gain or simply gain is a key performance number, which combines the antenna's directivity and electrical efficiency. As a transmitting antenna, the gain describes how well the antenna converts input power into radio waves headed in a specified direction. As a receiving antenna, the gain describes how well the antenna converts radio waves arriving from a specified direction into electrical power.

Guided media such as coaxial and twisted pair electrical cables, radio frequency waveguides, and optical fibers have losses that are exponential with distance. The path loss will be in terms of decibels (dB) per unit distance. This means that there can be a crossover distance beyond which the loss in a guided medium can exceed that of a line-of-sight path of the same length.

The above-described background relating to antenna and cable gains and losses are merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
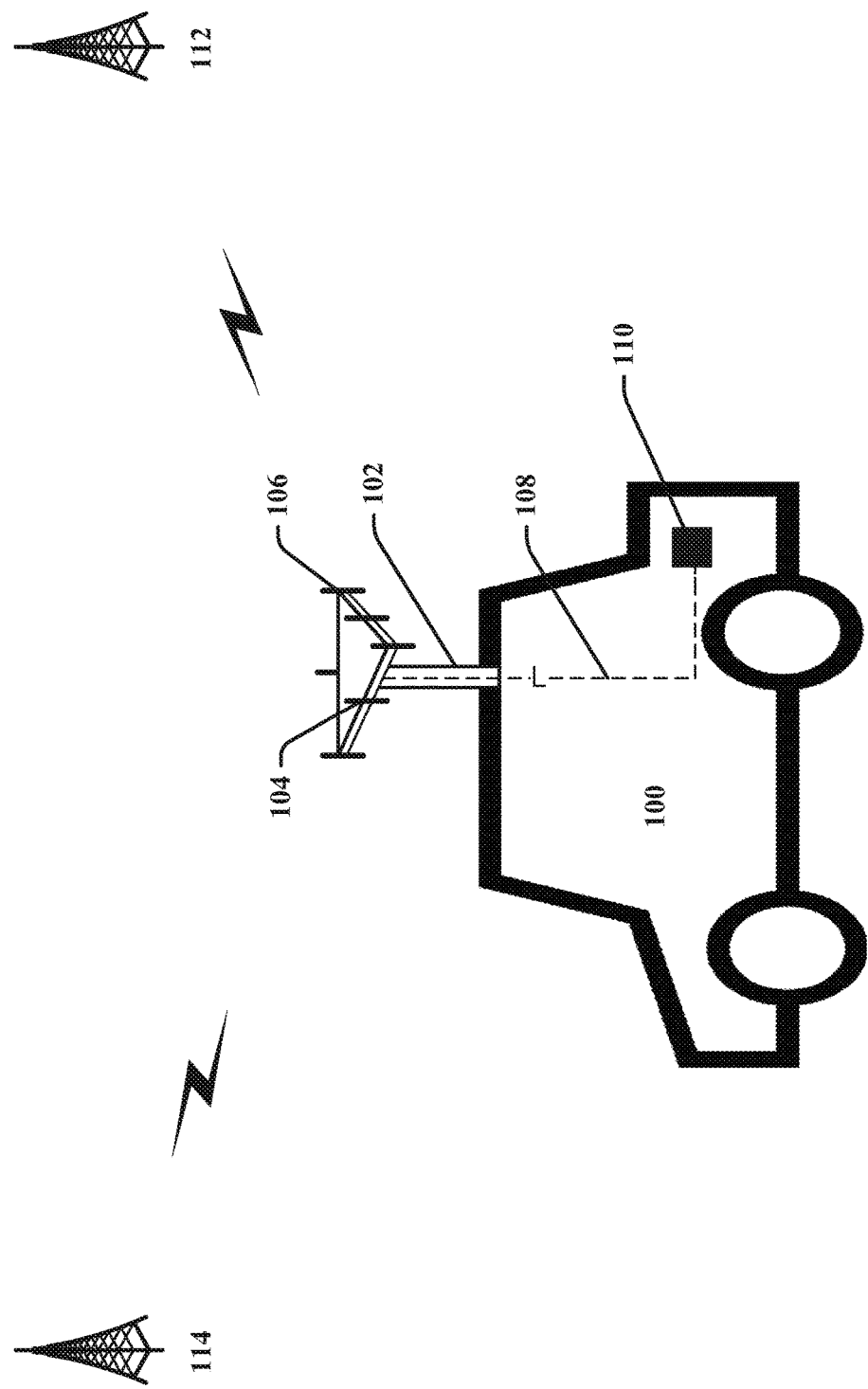
FIG. 1 illustrates an example wireless network comprising a mobile antenna transitioning from a first network to a second network according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate compensation of cable loss for antennas and their respective base equipment.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate antenna gain management. Facilitating antenna gain management can be implemented in connection with any type of device with a connection to the communications network such as: an automobile, a mobile handset, a computer, a handheld device, or the like.

In a cellular network, the coverage can be determined by a link budget of a frequency, but it can also be based on a received power level measured in millivolts (mV) per meter. A link budget is an accounting of all of the gains and losses from a transmitter, through a medium (free space, cable, waveguide, fiber, etc.) to a receiver in the telecommunication system. The link budge can take into account attenuation of a transmitted signal due to propagation, as well as antenna gains, feedline and miscellaneous losses. Randomly varying channel gains such as fading can be taken into account by adding some margin depending on the anticipated severity of its effects. For example, a simple link budget equation can comprise:

$$\text{Received Power (dBm)} = \text{Transmitted Power (dBm)} + \text{Gains (dB)} - \text{Losses (dB)} \quad \text{Eqn (1)}$$

Power spectral density (PSD) can be achieved for a carrier as a function of power transmitted divided by bandwidth transmitted. Therefore, spectrum, on a per service level, can be efficiently used to extend difficult and highly user perceived services, such as voice, on narrower channels to achieve a higher PSD. Consequently, the higher PSD can provide better specific service coverage into areas and structures that would otherwise drive a higher cost solution. Effectively, the spectrum can be used in smaller bandwidths to increase the received density for real time services, such as voice over long-term evolution (VoLTE), to compliment capacity or extend services that are highly perceived by the customer. Cellular systems can benefit from the higher PSD to achieve reliable quality communication.

Although $4^{th}$ generation (4G) networks are tuned for smartphones that are typically placed inside a moving vehicle, tuning for antennas on an automobile can be different. The antenna outside of the automobile can receive more signals, but different bands can be attenuated differently due to cable characteristics. This can result in band specific differences in relation to system gains and losses. Important network thresholds can be compensated with only one offset parameter. However, this does not work well due to the need for different offset parameters associated with different bands. Consequently, this can result in a shift in layer management and traffic loading of network resources. In spite of the aforementioned challenges, cable attenuation and antenna difference values can be stored and updated in a calibration table to provide band appropriate parity with smartphones.

Consequently radio frequency (RF) system calibration can allow automobile antennas in advanced 4G/5G protocols to function like smartphones. Calibration can comprise cable loss and antenna differences for each band. Band specific calibration tables can be maintained in non-volatile memory to store these system settings.

Outside of connected car, antenna gain management can be applied to other technologies including, but not limited to: smart home devices (i.e. refrigerators, security systems, etc.), dog collar devices, vending machines, etc. Additionally, this technology can be applied to internet of things (IoT) products, especially where the antenna is not integrated with a wireless module.

This disclosure provides for improved connected car mobility performance (call performance, throughput), network layer management, and network resources. While tethered antennas in connected car provide a very different RF system, the network can treat the tethered antennas like any other mobile device or user equipment.

An antenna connected to an exterior of an automobile with antenna base equipment being remote from the antenna, can experience various frequencies, during layer selection, as the automobile moves. The antenna can be remotely connected to the base equipment by a coaxial cable, fiber cable, telephone cable, and/or wirelessly connected. For instance, on a lower frequency band, a cable loss might be low or negligible for a coaxial cable, however, for a higher frequency band, the cable loss can be so great that it can negate having the antenna on the exterior of the automobile. The coaxial cable can be at a distance from the antenna and can be used to feed the antenna. The coaxial cable can have an inner conductor surrounded by a tubular insulating layer, surrounded by a tubular conducting shield. The coaxial cable can also have an insulating outer sheath or jacket. Coaxial cables can be used as a transmission line for radio frequency signals. Its applications include feed lines connecting radio transmitters and receivers with their antennas, computer network (Internet) connections, and distributing cable television signals. Consequently, coaxial cables can be installed next to metal objects, such as gutters, without the power losses that occur in other types of transmission lines. Coaxial cables can also provide protection of the signal from external electromagnetic interference.

It is noted that radio component(s) can be functionally coupled through links such as cables (e.g., RF and microwave coaxial lines), ports, switches, connectors, and the like, to a set of one or more antennas that transmit and receive wireless signals.

Although the coaxial cable can mitigate some types of interference, there can still be a cable loss related to the length of the cable to the antenna. The cable loss can be compensated as the automobile transitions into different frequency bands. A compensation/calibration value can be determined by measuring an output power at the end of the cable, a total received gain, and a total received sensitivity of a frequency band. The compensation/calibration value can be dependent upon the length of the cable, the frequency, a location, a velocity, a location, etc. For instance, if the output power measurement indicates a 10 db cable loss, then the gain can be increased to 10 db to accommodate for the cable loss. A gain can be adjusted by leveraging a variable amplifier, a variable transmitter, a processor, and/or a memory.

Cable loss measurements can be determined by using the base equipment, which can be communicatively coupled to the antenna by the cable connection (e.g., wire, cable, etc.) having a length, L, where L can be a positive real number. The compensation component of the base equipment can alter, modify, or otherwise correct the cable loss measurements based on L and frequency data.

Changes in signal quality as the automobile transitions from a serving cell to a neighboring cell can be based upon a signal level. A change ratio, and resulting handoff behavior between the serving cell and the neighboring cell can be significantly affected if there are two different bands involved. Consequently, one band will be much more attenuated than the other band. For instance, if the serving cell is weaker than −110 dBm, the antenna can begin to look for a better cell to go to. The antenna can then scan other cells and average the values of the other cell's frequencies. Then, if another cell is at least X dB better than the serving cell, the antenna will change to the new cell.

According to another embodiment, the base equipment can proactively compensate for an anticipated layer selection based on in indication that the layer selection is going to occur. For instance, a global positioning system (GPS) associated with the automobile can provide accurate location information as to the location of the automobile. In accordance with previous layer selections and frequency changes, a table can be constructed that associates the previous layer selections and frequency changes with a specific location(s). Consequently, if the base equipment has information that a layer selection has occurred previously between a first location and a second location, then the base equipment can provide the antenna with the compensation gain preemptively before the antenna needs to the gain.

Because cellular networks can assign radio resources based on the signal quality, there is a direct correlation between the signal-to-noise ratio and the number of bits that can be sent. Therefore, as the automobile moves from 3G to 4G, at the edge of the cell the signal quality can be low, but proactively compensating for the anticipated signal loss can increase the signal quality as the device transitions between 3G to 4G. Thus, the coverage area of the cell can be improved and the automobile can receive additional radio resources.

Alternatively, the base equipment may not want to generate a compensation value to adjust for a gain loss associated with the cable length. For instance, in certain scenarios, the base equipment may want to override an impending layer selection based on predetermined factors. Therefore, the base equipment can prevent the antenna from moving to a higher frequency band altogether, which would then prevent the additional cable loss due to moving to a higher frequency.

It should be noted that a gain reduction can also be performed, in the accordance with the aforementioned embodiments, to preserve battery power.

It should also be noted that an artificial intelligence (AI) component can facilitate automating one or more features in accordance with the disclosed aspects. A memory and a processor as well as other components can include functionality with regard to the figures. The disclosed aspects in connection with automobile antennas can employ various AI-based schemes for carrying out various aspects thereof. For example, a process for detecting one or more trigger events, such as transitioning between one cell to another, can be facilitated with an example automatic classifier system and process.

An example classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that can be automatically performed. In the case of communication systems, for example, attributes can be a frequency band and a technology and the classes can be an output power reduction value. In another example, the attributes can be a frequency band, a technology, and the presence of an object and the classes can be an output power reduction value.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying a transmit power, modifying one or more reported mobility measurements, and so forth. The criteria can include, but is not limited to, predefined values, frequency attenuation tables or other parameters, service provider preferences and/or policies, and so on.

In one embodiment, described herein is a method comprising receiving an indication of a change in frequency band associated with a first antenna gain of an antenna as the antenna transitions an operating band from a first frequency band to a second frequency band, and determining cable loss data associated with a loss in the antenna gain. In response to determining the cable loss data, determining a second antenna gain to compensate for the loss in the first antenna gain resulting in a determined antenna gain, and adjusting the first antenna gain to the determined antenna gain.

According to another embodiment, a system can facilitate, storing output power data related to an output power of a cable, and storing gain data related to a received gain from an antenna attached to the cable. Furthermore the system can facilitate receiving frequency threshold data associated with a frequency threshold of a frequency band received by the antenna. In response to the receiving the frequency threshold data, the system can determine a calibration value to adjust a gain of the antenna and send calibration data related to the calibration value to the antenna.

According to yet another embodiment, described herein is a machine-readable storage medium that can perform the operations comprising receiving first location data related to a first location of a mobile device, and receiving a first indication that the mobile device is moving from the first location to a second location related to second location data associated with a second frequency band of a second network device. In response to the receiving the first indication, the machine-readable medium can generate a calibration value for a threshold to be applied to a function of a difference between the first frequency band and the second frequency band, and send the calibration data related to the calibration value to an antenna.

These and other embodiments or implementations are described in more detail below with reference to the drawings.

Referring now to FIG. 1, illustrated is an example wireless network comprising an automobile antenna transitioning from a first network to a second network according to one or more embodiments. An automobile 100 can transition between the first network 112 and the second network 114. The automobile 100 can comprise an antenna 102 for sending and receiving radio signals from the first network 112 and the second network 114. The antenna 102 can comprise a transceiver 104 and a receiver 106. Additionally, the antenna 102 can be connected to base equipment 110 via a cable 108.

The base equipment 110 can be located in the trunk (or other remote area) away from the antenna 102. The distance between the antenna 102 and the base equipment 110 can be represented as length, L, where L can be a positive real number. The larger the length L, the more cable loss can be experienced as the automobile 100 moves from a low frequency band to a high frequency band. Consequently, a compensation value can be generated to determine a gain for the antenna 102 to compensate for the cable loss. Thus, the compensation value can be used to alter, modify, or otherwise correct for the cable loss in relation to the distance between the antenna 102 and the base equipment 110.

Figure 2:
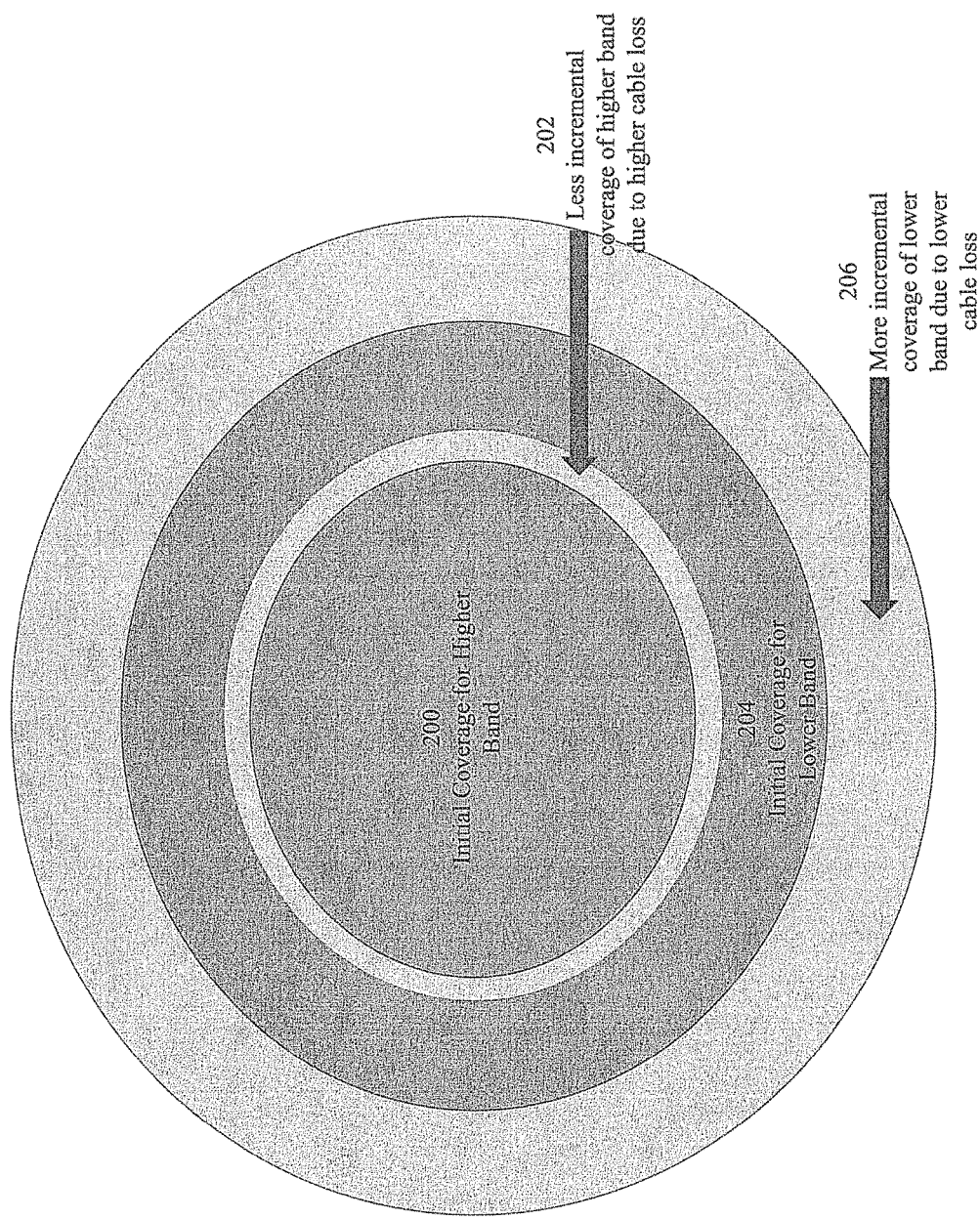
FIG. 2 illustrates an example wireless network coverage area change according to one or more embodiments.

Referring now to FIG. 2, illustrated is an example wireless network coverage area change according to one or more embodiments. For this illustration, the circles can represent cellular coverage radiating outwardly away from the center of the circles. Beginning with an initial coverage area for a lower band 204, the cable loss associated with an automobile antenna can be very small. As the automobile moves in an outward direction, away from the coverage for the higher band 200, towards coverage area 206, there can be a more incremental coverage of the lower band due to even less cable loss.

However, as the automobile moves in an inward direction, towards the coverage for the higher band 200, a layer selection can occur. The automobile antenna can experience less incremental coverage of the higher band 202 due to cable loss associated with moving towards the higher band 200 coverage.

Figure 3:
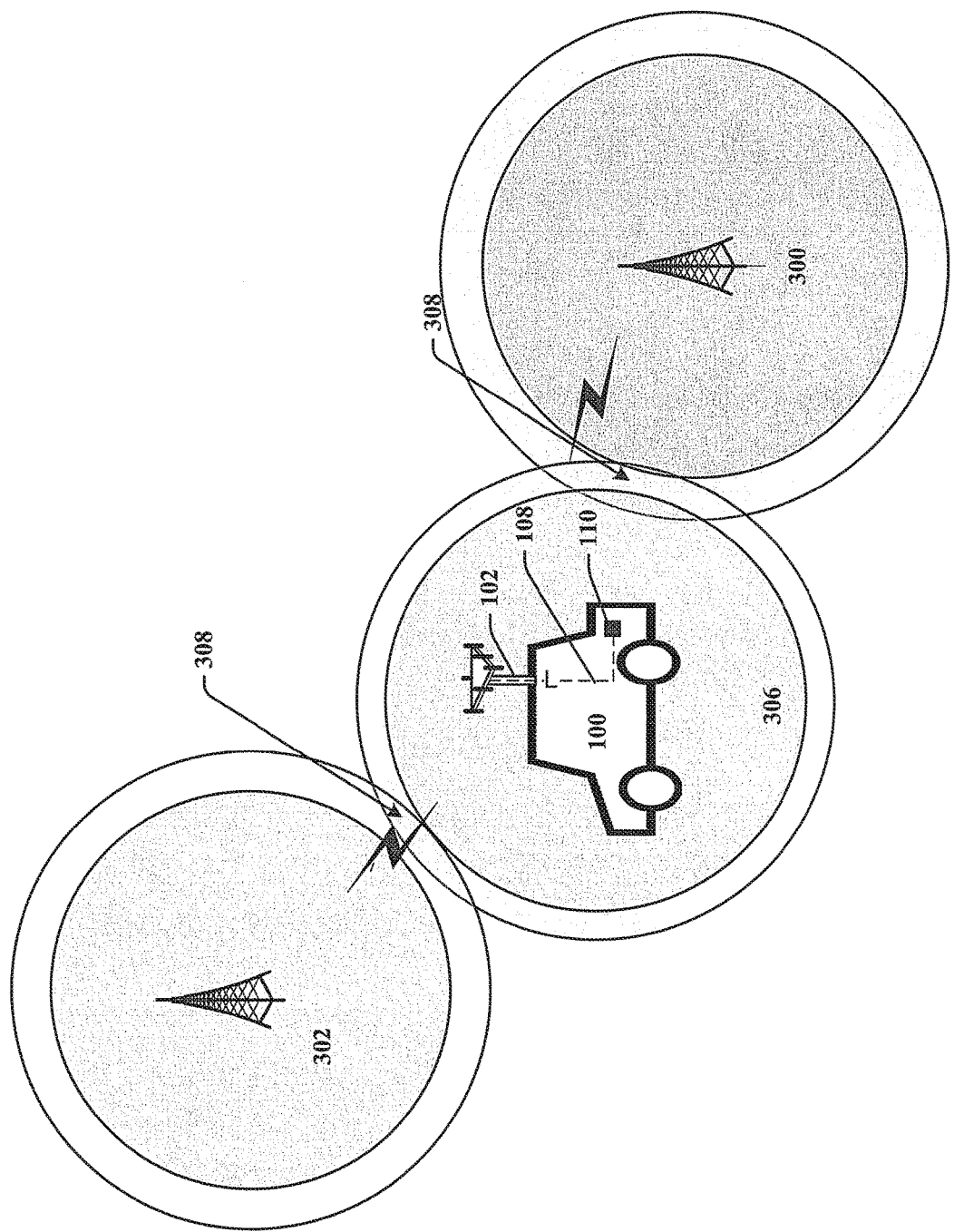
FIG. 3 illustrates an example wireless network comprising a mobile antenna transitioning from a first network coverage area to a second network coverage according to one or more embodiments.

Referring now to FIG. 3, illustrated is an example wireless network comprising a mobile antenna transitioning from a first network coverage area to a second network coverage according to one or more embodiments. As the automobile 100 transitions between cellular coverage 300 and cellular coverage 302, the automobile antenna 102 can be subjected to a cable loss associated with a frequency change and the length of the cable 108 from the antenna 102 to the base equipment 110. Therefore, if the cellular coverage area 300 has a lower frequency and the cellular coverage area 302 has a higher frequency, then the antenna 102 can experience a gain loss associated with the length of the cable 108. Based on the frequency differences and to compensate for the gain loss, the base equipment 110 can generate an amplification signal accordingly. The amplification signal can be sent to the antenna 102 to account for the gain loss during the automobile's 100 transition period 306. Areas 308 can represent locations where there are frequency thresholds during the automobile's 100 transition period 306. It should also be noted that if the automobile 100 moves from a higher frequency cellular coverage 302 to a lower frequency cellular coverage 300, an amplification reduction can be used to reduce or account for the additional gain that can be experienced by moving to the lower frequency cellular coverage 300.

Figure 4:
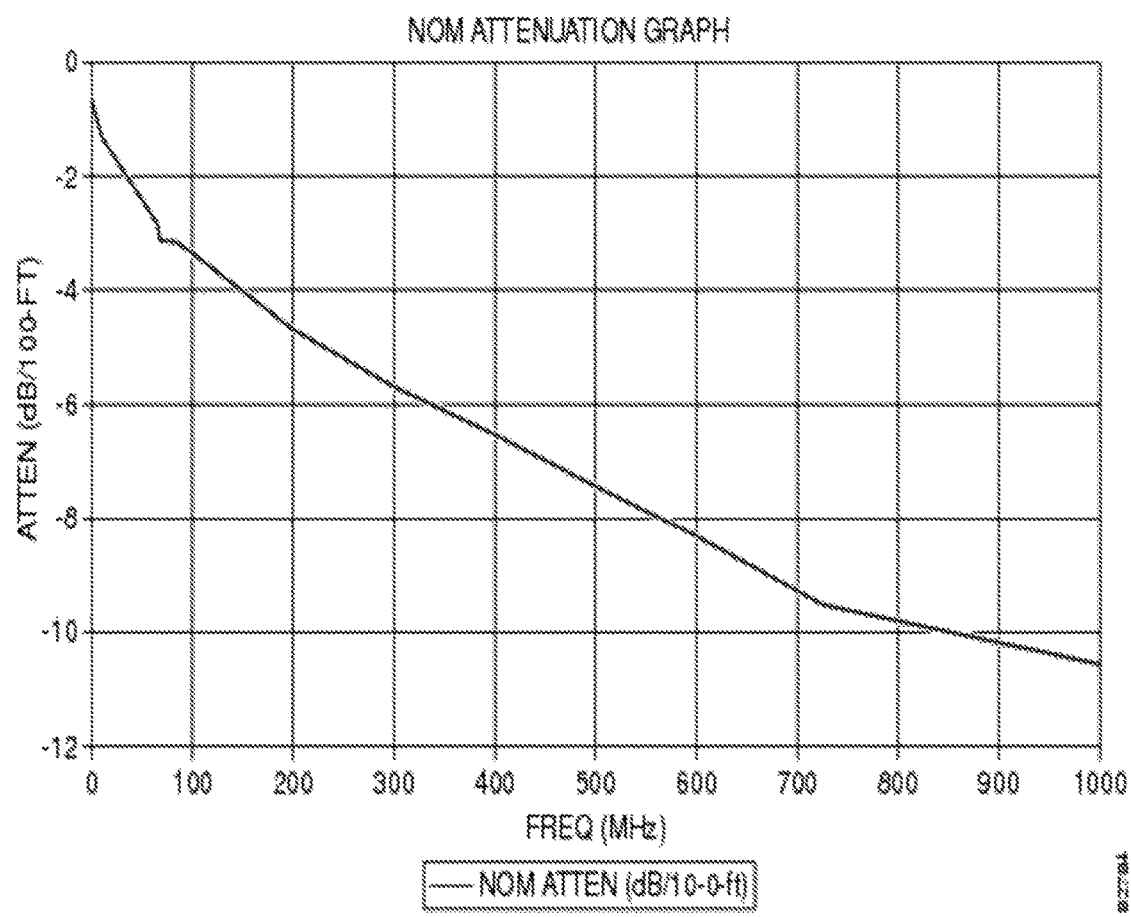
FIG. 4 illustrates an example attenuation graph according to one or more embodiments.

Referring now to FIG. 4, illustrated is an example attenuation graph according to one or more embodiments. FIG. 4 illustrates the signal attention decrease via cable loss as an automobile comprising an antenna transitions from a lower frequency network to a higher frequency network.

Figure 5:
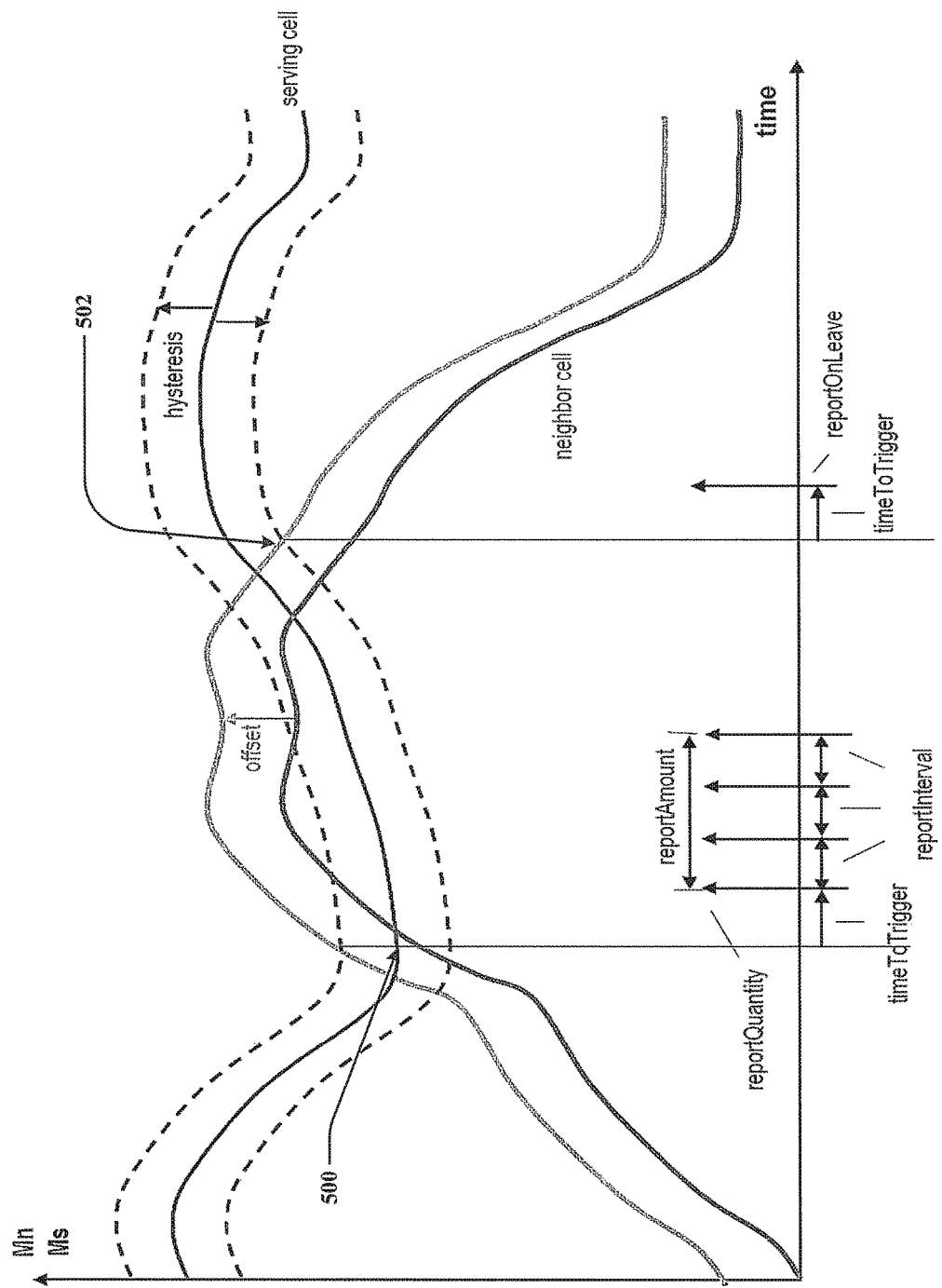
FIG. 5 illustrates an example wireless network graph representing signal attenuation as a mobile antenna transitions between network cells according to one or more embodiments.

Referring now to FIG. 5, illustrated is an example wireless network graph representing signal attenuation as a mobile antenna transitions between network cells according to one or more embodiments. A mobile antenna can transition from a first cellular network (a serving cell) to a second cellular network based on a signal level of the first cellular network. The ratio, and resulting handoff behavior can be changed significantly if there are two different frequency bands involved, resulting in one frequency band being more attenuated than other frequency band. For instance, if a serving cell is weaker than −110 dBm as illustrated by the graph at point 500, the mobile antenna can begin looking for better cell to go to. Consequently, the mobile antenna can scan other cells and average their respective frequency values. Then, if the second cellular network frequency is at least X dB better than the first cellular network's frequency, the mobile antenna can switch over to the second cellular network as illustrated by the graph at point 500. Consequently, because the frequency of the second cellular network is higher than the frequency of the first cellular network, the mobile antenna can experience cable loss as a result of the distance from the mobile antenna to the base equipment of the mobile antenna. The network can send reconfiguration message data, comprising data related to the second cellular network, to the mobile antenna. The reconfiguration message data can indicate that the second cellular network is now the new serving cell. Therefore a compensation value can be determined and applied to an amplification signal for the mobile antenna to offset the cable loss generated by switching to the second cellular network. The amplification or compensation value can be reduced as illustrated by the graph at point 502 once the mobile antenna can transition back to the first cellular network. The amplification or compensation value can also be terminated at the point where the mobile antenna transitions back to the first cellular network. The network can again send reconfiguration message data, comprising data related to the first cellular network, to the mobile antenna. The reconfiguration message data can then indicate that the first cellular network is again the serving cell.

Figure 6:
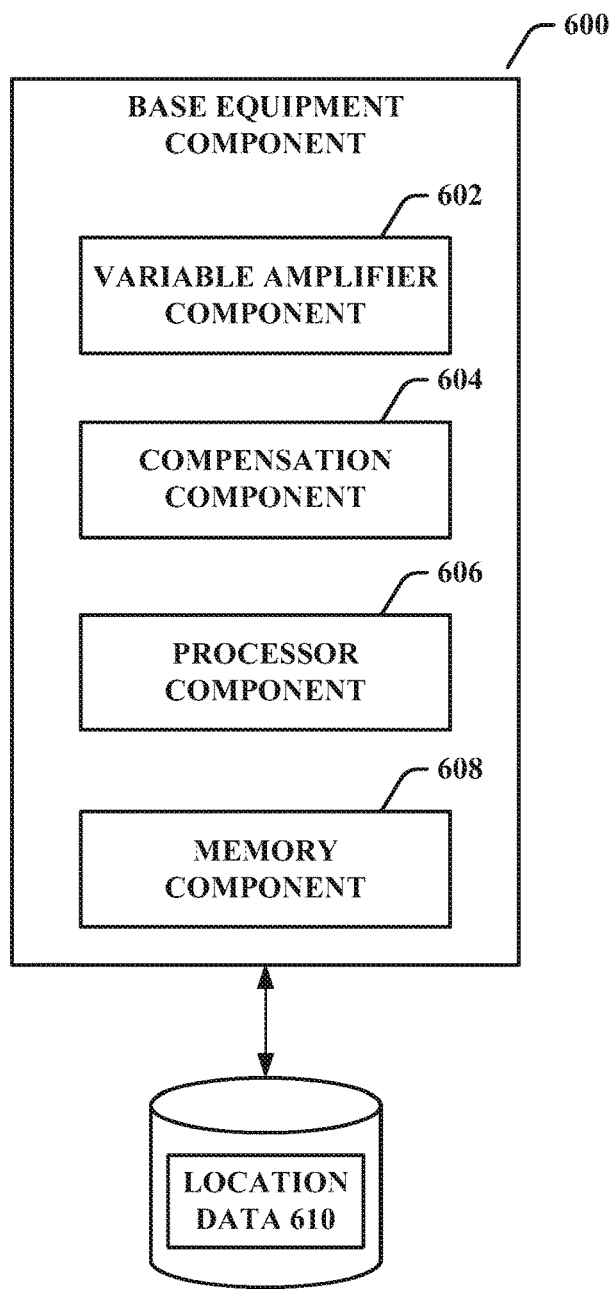
FIG. 6 illustrates an example antenna base equipment component according to one or more embodiments.

Referring now to FIG. 6, illustrated is an example antenna base equipment component according to one or more embodiments. The base equipment 600 can comprise several subcomponents including, but not limited to: a variable amplifier 602, a compensator 604, a processor 606, and/or a memory 608. The variable amplifier 602 can be used to send varied amplified gain signals to the mobile antenna, via a cable feed to the antenna, depending on a control voltage. The compensator 604 can determine what compensation factor is needed to accommodate for a gain loss and send compensation data to the variable amplifier to adjust a gain signal to be sent to the antenna. The processor 606 can carry out predetermined instructions associated with varying the gains of the antenna, and the memory 608 can store related data in a data structure associated with previous layer selections, frequency bands, and location. Additionally, location data 610 associated with a current, previous, or anticipated location of the automobile antenna can be sent to the base equipment 600. Alternatively, the location data 610, which can also be GPS data, can be stored externally to the base equipment 600 or stored within the base equipment 600.

Figure 7:
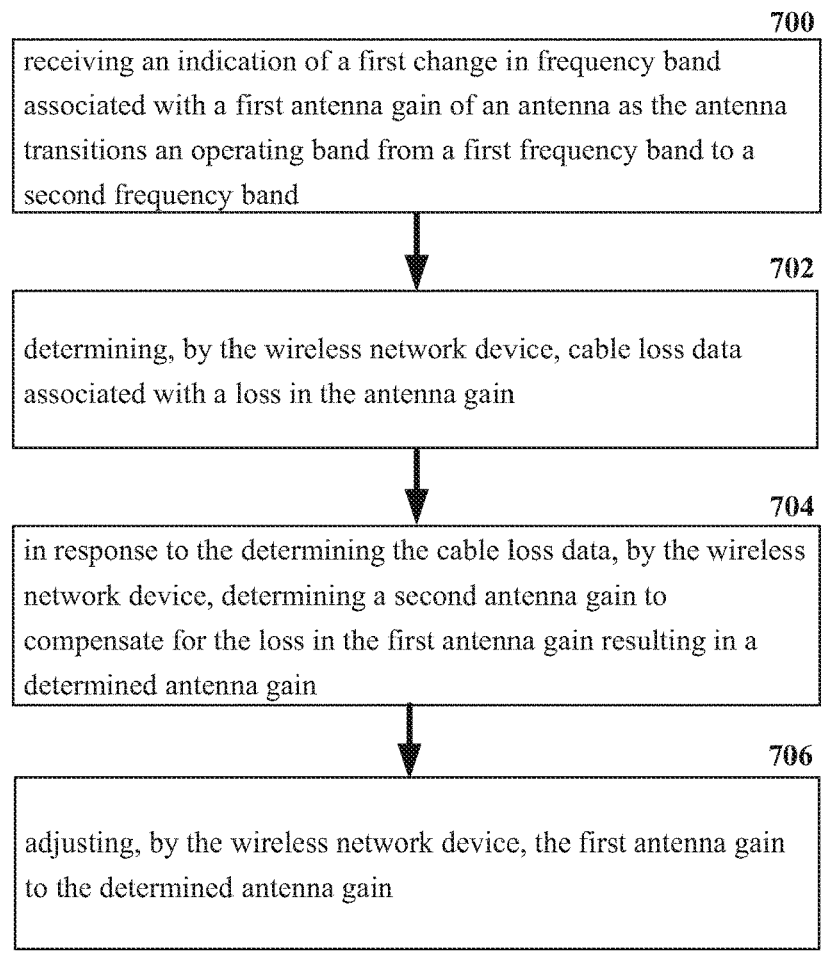
FIG. 7 illustrates an example schematic system block diagram for compensating for a loss antenna gain due to a cable according to one or more embodiments.

Referring now to FIG. 7, illustrated is an example schematic system block diagram for compensating for a loss in an antenna gain due to a cable according to one or more embodiments. At element 700, an indication of a first change in frequency band associated with a first antenna gain of an antenna as the antenna transitions an operating band from a first frequency band to a second frequency band can be received.

As an automobile antenna transitions from one cellular network to another cellular network, the system can receive an indication of such based on the first change in frequency band. At element 702, cable loss data associated with a loss in the antenna gain can be determined. Due to the change in frequency band, there can be an associated cable loss, especially when transitioning to a higher frequency band. Thereafter, in response to the determining the cable loss data, a second antenna gain can be determined at element 704 to compensate for the loss in the first antenna gain resulting in a determined antenna gain. Although the compensation value can be equal to the cable loss value, it should be noted that the compensation value can also be greater than or less than the cable loss value based on various scenarios. Consequently, the first antenna gain can be adjusted to the determined antenna gain at element 706.

Figure 8:
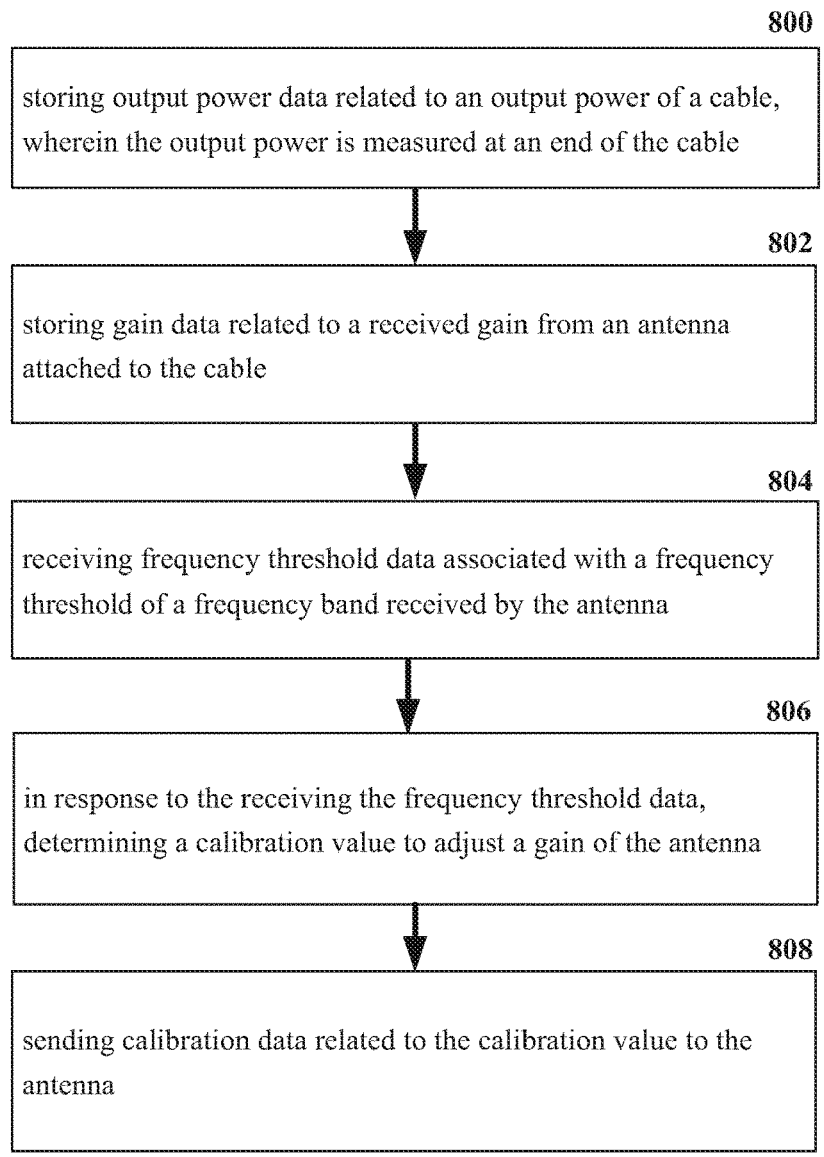
FIG. 8 illustrates an example schematic system block diagram for calibrating an antenna gain based on a frequency band sensitivity according to one or more embodiments.

Referring now to FIG. 8, illustrated is an example schematic system block diagram for calibrating an antenna gain based on a frequency band threshold according to one or more embodiments. A baseline output antenna power can be determined for purposed of antenna calibration. At element 800, output power data related to an output power of a cable can be stored, wherein the output power is measured at an end of the cable. At element 802, gain data related to a received gain from an antenna attached to the cable can also be stored. After determining the baseline data, gain data can be used to assist in determining a frequency threshold. Frequency threshold data associated with a frequency threshold of a frequency band can be received by the antenna at element 804. In response to the receiving the frequency threshold data, a calibration value can be determined at element 806 to adjust a gain of the antenna and the calibration data related to the calibration value can be sent to the antenna at element 808.

Figure 9:
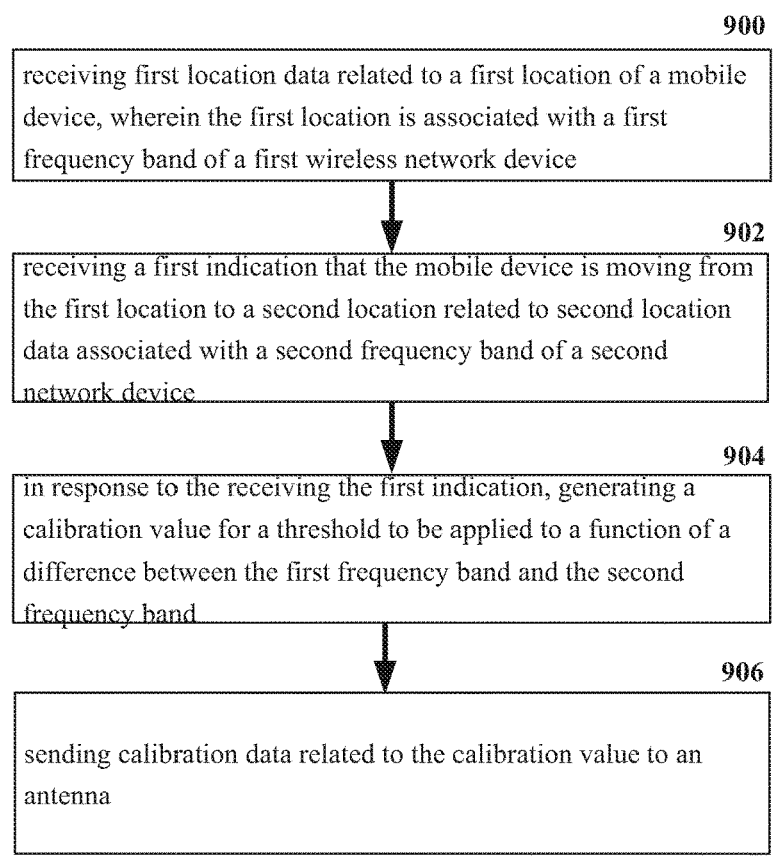
FIG. 9 illustrates an example schematic system block diagram for generating gain calibration data in response to a location change according to one or more embodiments.

Referring now to FIG. 9, illustrated is an example schematic system block diagram for generating gain calibration data in response to a location change according to one or more embodiments. At element 900, first location data related to a first location of a mobile device can be received, wherein the first location is associated with a first frequency band of a first wireless network device. Cable loss can be increased as the mobile antenna transitions to a higher frequency band within a wireless network. Therefore, location data can be determined to assist in preemptively determining a calibration value to adjust a gain of the antenna system. At element 902, a first indication that the mobile device is moving from the first location to a second location related to second location data associated with a second frequency band of a second network device can be received. Previously stored location data can also be used to proactively determine a calibration value. In response to the receiving the first indication at element 902, a calibration value can be generated at element 904 for a threshold to be applied to a function of a difference between the first frequency band and the second frequency band. Since the cable loss can be directly correlated to the length of the cable connection between the antenna and the antenna base equipment, the calibration value can also be directly correlated to the length of a cable connection between the antenna and the antenna base equipment. Thereafter, calibration data related to the calibration value can be sent to an antenna at element 906.

Figure 10:
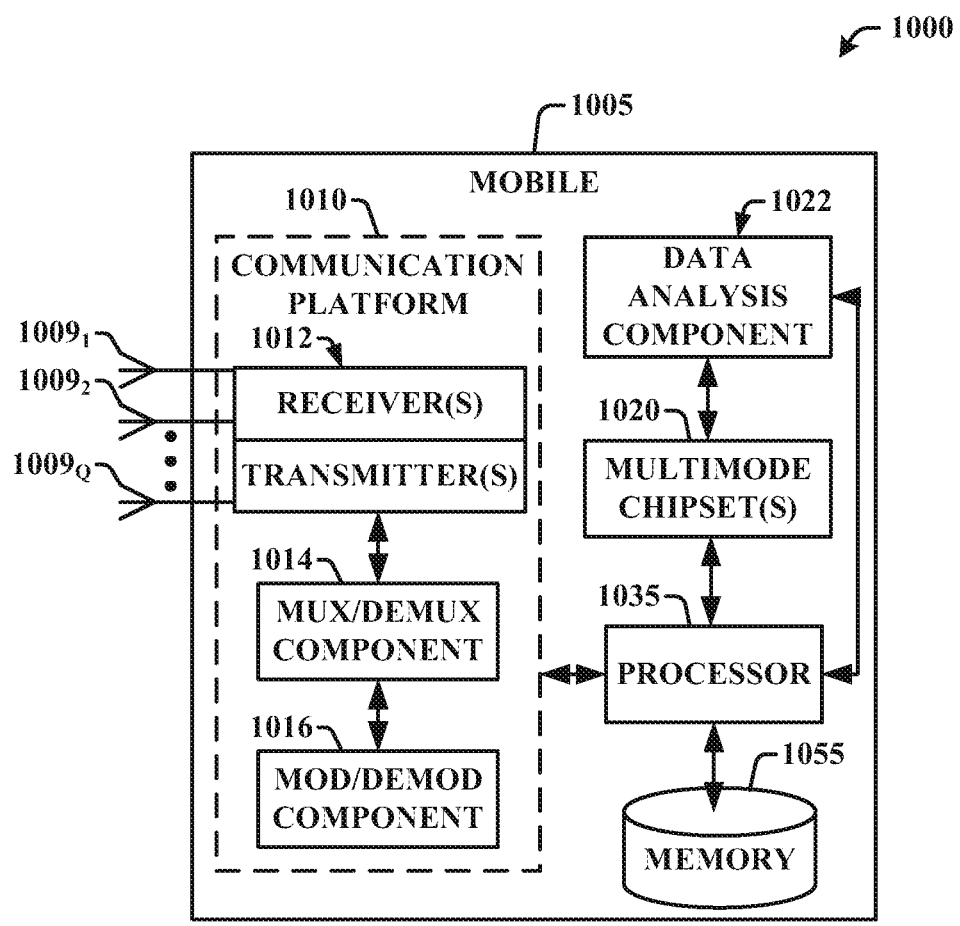
FIGS. 10-11 illustrate example systems that can be employed with various aspects described in this disclosure.
Figure 11:
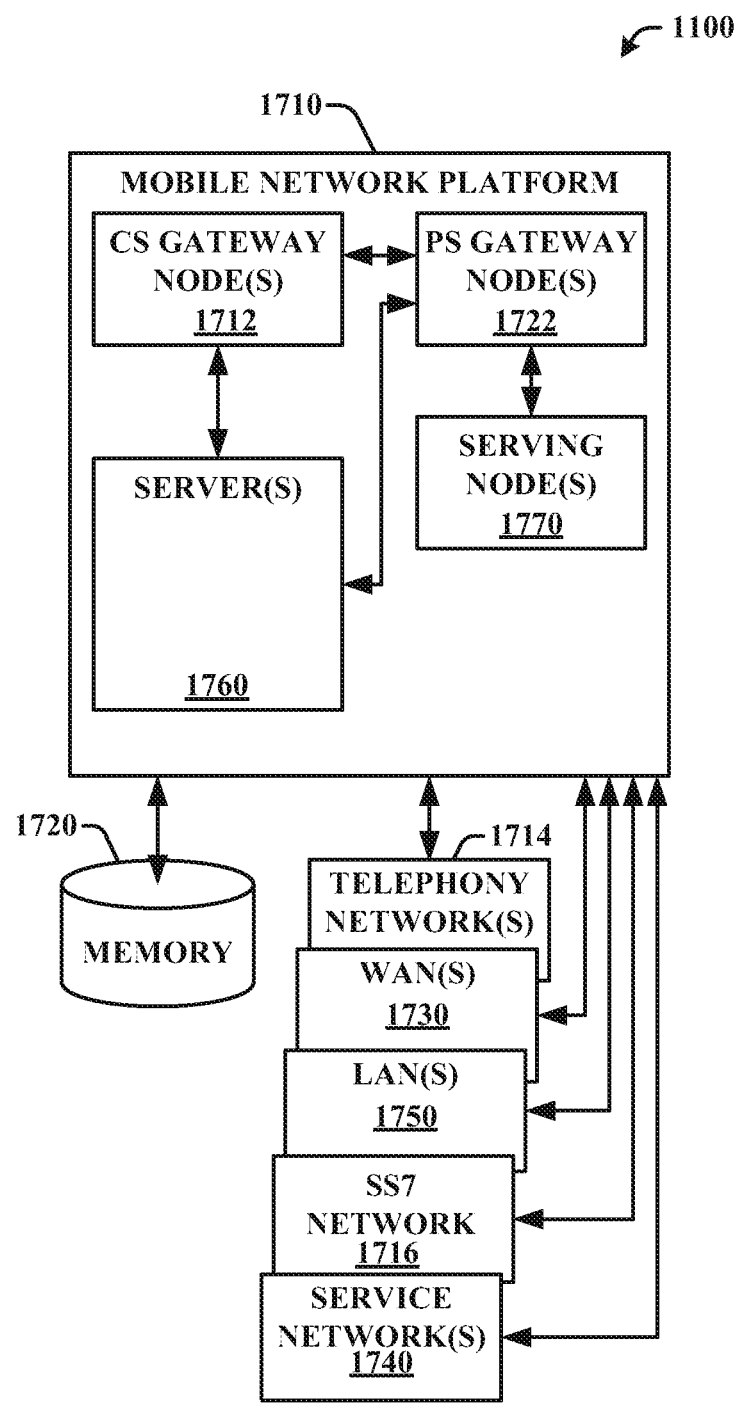

To provide further context for various aspects described herein, FIG. 10 illustrates a non-limiting example block diagram of a system 1000 of a mobile device 1005 that can deliver content(s) or signaling directed to a device in accordance with aspects described herein. Additionally, FIG. 11 illustrates a non-limiting example block diagram of a system 1100 of a mobile network platform 1110 which can provide subscriber data in accordance with aspects described herein.

In the mobile device 1005 of FIG. 10, which can be a multimode access terminal, a set of antennas $1009_1$-$1009_Q$ (Q is a positive integer) can receive and transmit signal(s) from and to wireless devices like access points, access terminals, wireless ports and routers, and so forth that operate in a radio access network. It should be appreciated that antennas $1009_1$-$1009_Q$ are a part of communication platform 1010, which comprises electronic components and associated circuitry that provide for processing and manipulation of received signal(s) and signal(s) to be transmitted; e.g., receivers and transmitters 1012, mux/demux component 1014, and mod/demod component 1016.

In the system 1000, multimode operation chipset(s) 1020 allows the mobile device 1005 to operate in multiple communication modes in accordance with disparate technical specification for wireless technologies. In an aspect, multimode operation chipset(s) 1020 utilizes a communication platform 1010 in accordance with a specific mode of operation (e.g., voice, Global Positioning System (GPS)). In another aspect, multimode operation chipset(s) 1020 can be scheduled to operate concurrently (e.g., when Q>1) in various modes or within a multitask paradigm.

The mobile device 1005 can comprise a data analysis component 1022 and can convey content(s) or signaling in accordance with aspects described herein. It should be appreciated that the data analysis component 1022, can include a display interface that renders content in accordance with aspects of a user prompt component (not shown) that can reside within the data analysis component 1022.

The mobile device 1005 can also comprise a processor 1035 configured to confer functionality, at least in part, to substantially any electronic component within the mobile device 1005, in accordance with aspects described herein. As an example, a processor 1035 can be configured to execute, at least in part, instructions in multimode operation chipset(s) that afford multimode communication through the mobile device 1005 such as concurrent or multitask operations of two or more chipset(s). As another example, the processor 1035 can facilitate the mobile device 1005 to receive and convey signaling and content(s) (e.g., various data flows) that are part of an active management act initiated by a subscriber that operates mobile device 1005, or an approval cycle associated with auxiliary subscribers (e.g., secondary subscriber, tertiary subscriber, etc.). Moreover, the processor 1035 can facilitate the mobile device 1005 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. A memory 1055 can store data structures (e.g., metadata); code structure(s) (e.g., modules, objects, classes, procedures) or instructions; network or device information like policies and specifications, attachment protocols; code sequences for scrambling, spreading and pilot (e.g., reference signal(s)) transmission; frequency offsets, cell IDs, and so on.

In the system 1000, the processor 1035 is functionally coupled (e.g., through a memory bus) the to memory 1055 in order to store and retrieve information necessary to operate and/or confer functionality, at least in part, to the communication platform 1010, the multimode operation chipset(s) 1020, the data analysis component 1022, and substantially any other operational aspects of a multimode mobile device 1005.

FIG. 11 illustrates a block diagram 1100 of a mobile network platform 1110 which can provide data analysis in accordance with aspects described herein. Generally, the mobile network platform 1110 can include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect, as described above, component within PS domain of the network platform 1110 can be employed to effect communication in accordance with aspects described herein.

With respect to CS communication, the mobile network platform 1110 can comprise CS gateway node(s) 1112 which can interface CS traffic received from legacy networks such as telephony network(s) 1114 (e.g., public switched telephone network (PSTN), or a public land mobile network (PLMN)) or a SS7 network 1116. Circuit switched gateway node(s) 1112 can authorize and authenticate traffic (e.g., voice) arising from such networks. Additionally, CS gateway node(s) 1112 can access mobility, or roaming, data generated through the SS7 network 1116; for instance, mobility data stored in a visitation location register (VLR), which can reside in a memory 1120. Moreover, the CS gateway node(s) 1112 interfaces CS-based traffic and signaling and gateway node(s) 1122. As an example, in a 3GPP UMTS network, CS gateway node(s) 1112 can be embodied, at least in part, in gateway GPRS support node(s) (GGSN).

In addition to receiving and processing CS-switched traffic (e.g., content(s) that can be part of a content(s) transmitted by a service provider) and signaling, PS gateway node(s) 1122 can authorize and authenticate PS-based data sessions with served mobile devices, non-mobile devices, and access points. Data sessions can include traffic, or content(s), exchange with networks external to the mobile network platform 1110, such as wide area network(s) (WANs) 1130 or service network(s) 1140; it should be appreciated that local area network(s) (LANs) 1150 can also be interfaced with the mobile network platform 1110 through PS gateway node(s) 1122. The packet-switched gateway node(s) 1122 can generate packet data contexts when a data session is established. To that end, in an aspect, the PS gateway node(s) 1122 can include a tunnel interface (e.g., tunnel termination gateway (TTG) in 3GPP UMTS network(s) (not shown)) which can facilitate packetized communication with disparate wireless network(s), such as network platform and associated radio access network, Wi-Fi networks. It should be further appreciated that the packetized communication can include multiple flows that can be generated through service (e.g., provisioning) and application server(s) 1160. It is to be noted that in 3GPP UMTS network(s), PS gateway node(s) 1122 (e.g., GGSN) and tunnel interface (e.g., TTG) comprise a packet data gateway (PDG).

The mobile network platform 1110 can also comprise serving node(s) 1170 that convey the various packetized flows of data streams (e.g., content(s) or signaling directed to a subscribed data), received through the PS gateway node(s) 1122. As an example, in a 3GPP UMTS network, the serving node(s) 1170 can be embodied in serving GPRS support node(s) (SGSN).

Server(s) 1160 in the mobile network platform 1110 can execute numerous applications (e.g., location services, online gaming, wireless banking, wireless device management, etc.) that can generate multiple disparate packetized data streams or flows, and manage (e.g., schedule, queue, format, etc.) such flows. Such application(s), for example can include add-on features to standard services provided by the mobile network platform 1110. Data streams (e.g., content(s) or signaling directed to a file) can be conveyed to the PS gateway node(s) 1122 for authorization/authentication and initiation of a data session, and to the serving node(s) 1170 for communication thereafter.

The server(s) 1160 can also effect security (e.g., implement one or more firewalls) of the mobile network platform 1110 to ensure network's operation and data integrity in addition to authorization and authentication procedures that the CS gateway node(s) 1112 and the PS gateway node(s) 1122 can enact. Moreover, the server(s) 1160 can provision services from external network(s), e.g., the WAN 1130, or Global Positioning System (GPS) network(s) (not shown). It is to be noted that the server(s) 1160 can include one or more processors configured to confer at least in part the functionality of the macro network platform 1110. To that end, the one or more processor can execute code instructions stored in the memory 1120, for example.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, et cetera), optical disks (e.g., compact disk (CD), digital versatile disk (DVD), et cetera), smart cards, and flash memory devices (e.g., card, stick, key drive, et cetera). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

As used herein, the term "identifying information" is intended to be contact information known at the time a communication is connected relating to a party of the communication and can include (but is not limited to) telephone numbers, aliases, messenger names and identifiers, e-mail addresses, extensions, device personal identification numbers (PINs), distribution lists, network addresses, component addresses (e.g., medium access control (MAC) addresses, machine addresses, et cetera) or other component identifiers, user names, nicknames, domains, signatures (electronic, physical, and otherwise), references, forwarding configurations, and network addresses. The term "communication" as used when two or more devices correspond is intended to expansively capture all means of transmission or reception available to state-of-the-art devices and can include (but is not limited to) cellular, satellite transmission, VOIP and SIP voice connections, short message service (SMS) exchanges, broadcast data, network sessions, e-mails, instant messages, other network-based messaging, PIN or other device-based messaging, voicemail, picture mail, video mail, mixed-content correspondence, Unified Messaging (UM), and other digital and analog information transmitted between parties in any local and/or distant, physical and/or logical region.

Similarly, the concept of "data transmission" herein is intended to broadly represent known means of information exchange with digital or analog systems, including but not limited to hard-wired and direct connections (e.g., local media, universal serial bus (USB) cable, integrated drive electronics (IDE) cable, category 5 cable, coaxial cable, fiber optic cable and telephone cable), shared connections (e.g., remote and/or distributed resources) wireless connections (e.g., Wi-Fi, Bluetooth, infrared wireless, Zigbee, other 802.XX wireless technologies, and personal area network connections), messaging systems (e.g., short message service (SMS), instant messaging, and other network-enabled other messaging), mobile or cellular transmissions and combinations thereof (e.g., personal communication system (PCS) and integrated networks), Unified Messaging, and other means of techniques of communication employed by telephones, personal digital assistants (PDAs), computers and network devices. "Mixed-content message," as used herein, is intended to represent communications employing one or more means of data transmission to present one or more varieties of device-capable content, including (but not limited to) picture messages, audio or video messages, and messages where text or other media types accompany one another. A "user device" can include, but is not limited to, data-enabled telephones (cellular telephones, smart phones, soft phones, VOIP and SIP phones, satellite phones, telephones coupled to computer systems, et cetera), communications receivers, personal digital assistants, pagers, portable e-mail devices, portable web browsers, media devices capable of receiving data, portable computers, and other electronics that allow a user to receive communications from other parties.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise historic data on previously served queries; communication party information from various sources; files and applications; and so forth. It is to be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of aspects of the claimed subject matter. It is, of course, not possible to describe every conceivable combination of components or methods for purposes of describing the claimed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. While various components have been illustrated as separate components, it will be appreciated that multiple components can be implemented as a single component, or a single component can be implemented as multiple components, without departing from example embodiments. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   storing, by a wireless network device comprising a processor, output power data related to an output power of a cable, wherein the output power is measured at an end of the cable;
   storing, by the wireless network device, gain data related to a gain of an antenna attached to the cable, the gain data being received from the antenna;
   receiving, by the wireless network device, frequency threshold data associated with a frequency threshold of a frequency band received by the antenna;
   in response to the receiving the frequency threshold data and based on the output power data, generating, by the wireless network device, a calibration value to adjust the gain of the antenna; and
   transmitting, by the wireless network device, calibration data related to the calibration value to the antenna.

2. The method of claim 1, wherein the end of the cable is the end closest to the antenna.

3. The method of claim 2, further comprising:
   generating, by the wireless network device, a data structure comprising the power data, the gain data, and the frequency threshold data for access during the generating of the calibration value.

4. The method of claim 1, further comprising:
   measuring, by the wireless network device, the output power at the end of a connection of the cable between the antenna and a base equipment for the antenna.

5. The method of claim 1, wherein the gain is a first antenna gain, and further comprising:
   storing, by the wireless network device, the first antenna gain, a second antenna gain, a first frequency band, a second frequency band, and cable loss data in a data structure accessible by the wireless network device to facilitate adjustment of the first antenna gain to a determined antenna gain.

6. The method of claim 1, further comprising:
   in response to a change in a coordinate of a global positioning system, determining, by the wireless network device, that the antenna is transitioning from a first frequency band to a second frequency band different than the first frequency band.

7. The method of claim 1, further comprising:
   in response to the generating, adjusting, by the wireless network device, the gain from the antenna based on the calibration data.

8. A system, comprising:
a processor; and
a memory that stores executable instructions that, when executed by the processor, facilitate performance of operations, comprising:
- storing output power data related to an output power of a cable, wherein the output power is measured at an end of the cable;
- storing gain data related to a gain of an antenna attached to the cable and received from the antenna;
- receiving frequency threshold data associated with a frequency threshold of a frequency band received by the antenna;
- in response to the receiving the frequency threshold data, determining a calibration value to adjust the gain of the antenna; and
- sending calibration data related to the calibration value to the antenna.

9. The system of claim 8, wherein the end of the cable is the end closest to the antenna.

10. The system of claim 8, wherein the operations further comprise:
generating a data structure comprising the output power data, the gain data, and the frequency threshold data for access during the determining of the calibration value.

11. The system of claim 8, wherein the calibration data is used to adjust the gain received from the antenna.

12. The system of claim 8, wherein the calibration data is based on a length of a cable connection between the antenna and base equipment for the antenna.

13. The system of claim 8, wherein the operations further comprise:
in response to the determining the calibration value, assigning a network resource to the antenna.

14. The system of claim 13, wherein the assigning the network resource comprises assigning the network resource using a limit based on the frequency threshold.

15. A non-transitory machine-readable medium, comprising executable instructions that, when executed by a processor, facilitate performance of operations, comprising:
- storing output power data related to an output power of a cable, wherein the output power is measured at an end of the cable;
- storing gain data related to a received gain from an antenna attached to the cable and representative of a gain of the antenna;
- facilitating receiving frequency threshold data associated with a frequency threshold of a frequency band received by the antenna;
- based on the frequency threshold data, generating a calibration value to adjust the gain of the antenna; and
- based on the calibration value, facilitating sending calibration data representative of the calibration value to the antenna.

16. The non-transitory machine-readable of claim 15, wherein the calibration data comprises a length associated with a distance between the antenna and a base equipment of the antenna.

17. The non-transitory machine-readable medium of claim 15, wherein the operations further comprise:
storing first location data associated with a first location of a mobile device, second location data associated with a second location of the mobile device, and the calibration data in a data structure.

18. The non-transitory machine-readable medium of claim 17, wherein the operations further comprise:
in response to an indication that the mobile device is moving from the second location to the first location, reducing the calibration value based on the calibration data stored in the data structure.

19. The non-transitory machine-readable medium of claim 18, wherein the reducing the calibration value comprises reducing the calibration value by a value that is inversely proportional to the calibration value.

20. The non-transitory machine-readable medium of claim 18, wherein the reducing the calibration value comprises reducing the calibration value by a value that is proportional to a length associated with a distance between the antenna and a base equipment of the antenna.

* * * * *